United States Patent Office 3,472,895
Patented Oct. 14, 1969

3,472,895
AMINOALKYLENENORTRICYCLENES
Allan Poe Gray, Ossining, and Donald E. Heitmeier, Brewster, N.Y., assignors, by mesne assignments, to Mallinckrodt Chemical Works, St. Louis, Mo., a corporation of Missouri
No Drawing. Filed Dec. 23, 1966, Ser. No. 604,192
Int. Cl. C07c *147/02, 149/26, 147/00*
U.S. Cl. 260—563       10 Claims

ABSTRACT OF THE DISCLOSURE

Aminoaliphaticnortricyclenes such as, 3-(diethylaminoethylthio)-nortricyclene, having utility as bronchodilators and antidepressants, are conveniently prepared by contacting a bicycloheptadiene with an aminoaliphaticthiol.

---

The invention sought to be patented, in its composition aspect, is described as residing in the concept of a chemical compound having the generalized structure:

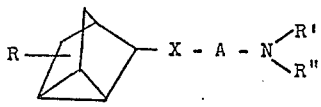

wherein R represents hydrogen, lower alkyl, lower alkoxy, halo, or haloalkyl; X represents thio, sulfinyl or sulfonyl; A represents alkylene, alkyleneoxyalkyl, alkylenethioalkyl, alkylenecarbonyloxyalkyl, alkyleneoxycarbonylalkyl, alkylenecarbonylthioalkyl, alkylenethiocarbonylalkyl, alkylenecarbonylaminoalkyl, or alkyleneaminocarbonylalkyl; R' represents hydrogen, alkyl, aryl, aryl substituted by R, aralkyl, hydroxyaralkyl, and amidino; R" represents hydrogen or lower alkyl; with the proviso that R' and R" can together form a five or six membered heterocyclic ring with the nitrogen atom to which they are attached.

As used herein, the term "lower alkyl" means alkyl radicals having 1 to 4 carbon atoms, inclusive, either straight or branched chain, among which are, for purposes of illustration, but without limiting the generality of the foregoing, methyl, ethyl, n-propyl, n-butyl, isopropyl, isobutyl, secondary-butyl, and tertiary-butyl.

Preferred compositions encompassed by this invention are those represented by the aforementioned formula wherein A contains from 2 to 6 carbon atoms and R, R' and R" contain a total of up to 36 carbon atoms. Particularly preferred compositions are those wherein R represents hydrogen, X-represents thio, sulfinyl or sulfonyl, A represents an alkylene group and R' and R" are alkyl, or R' and R" taken together form the piperidino, piperazino, pyrrolidino or morpholino groups.

The invention sought to be patented in the process of preparation aspects is described as residing in the concept of embodying such a molecular structure in tangible form by linking a polyhetero organic moiety and a nortricyclene nucleus through a sulfur atom by (1) the addition reaction of a bicycloetadiene with an aminoaliphatic thiol to give a 3-(aminoaliphaticthio)-nortricyclene, (2) oxidizing the 3-(aminoaliphaticthio)-nortricyclene to a 3-(aminoaliphaticsulfinyl)-nortricyclene, or (3) oxidizing the 3-(aminoaliphaticthio)-nortricyclene to the corresponding 3-(aminoaliphaticsulfonyl)-nortricyclene.

The invention sought to be patented, in the process of using aspect, is described as residing in the concept of using the tangible embodiment of a composition of matter identified as an aminoaliphaticnortricylene by administering to a human being such composition as the essential active ingredient of a pharmaceutical formulation for the application of the relief of pulmonary disfunction in human beings. It has been observed that the tangible embodiments of the invention possess the inherent applied use characteristics of exerting bronchodilator and favorable pulmonary effects in man, as hereinafter evidenced by clinical evaluation. In addition to the relief of pulmonary disfunction, the novel compositions of this invention have also been found to affect the central nervous system and to particularly show antidepressant activity.

The tangible embodiments of the composition aspect of the invention in their free base form are, for the most part, liquids having low aqueous solubility and are soluble in polar solvents such as lower aliphatic alcohols. Examination of the compounds produced according to the herein described process reveals physical characteristics such as nuclear magnetic resonance and infrared spectra and $pK_a$ values which confirm the molecular structure hereinbefore set forth. The aforementioned physical characteristics, taken together with the nature of the starting materials and the mode of synthesis positively confirm the structure of the compositions sought to be patented.

It will be apparent from the definition of —X—A—N< in the aforementioned formula that it is intended to include specifically or as equivalents, such representative radicals as: the primary aminoalkylthio groups, e.g., aminoethylthio, aminopropylthio, and the like; the substituted and unsubstituted tertiary aminoalkylthio groups, e.g., dimethylaminoethylthio, diethylaminoethylthio, diethylaminopropylthio, dipropylaminopentylthio and the like; the piperidinoalkylthio, the piperazinoalkylthio, the pyrrolidinoalkylthio, the morpholinoalkylthio groups, e.g., piperidinoethylthio, piperazinopropylthio, pyrrolidinoethylthio, morpholinoethylthio, and the like; the substituted and unsubstituted secondary aminoalkylthio groups, e.g., ethylaminoethylthio, β-hydroxyphenethylaminoethylthio, guanidinoethylthio, and the like.

Other representive radicals include the primary aminoalkoxycarbonylalkylthio groups, e.g., aminoethoxycarbonylmethylthio, and the like; the substituted and unsubstituted tertiary aminoalkoxycarbonylalkylthio groups, e.g., dimethylaminoethoxycarbonylmethylthio, diethylaminoethoxycarbonylmethylthio, diethylaminopropoxycarbonylethylthio, and the like; the piperidinoalkoxycarbonylalkylthio, the piperazinoalkoxycarbonylalkylthio, the pyrrolidinoalkoxycarbonylalkylthio, the morpholinoalkoxycarbonylalkylthio and the like; the substituted and unsubstituted secondary aminoalkoxycarbonylalkylthio groups, e.g., ethylaminoethoxycarbonylmethylthio, methylaminopropoxycarbonylethylthio. and the like.

Further representative radicals included within the aforementioned formula are: the primary aminoalkylthiocarbonylalkylthio groups, e.g., aminoethylthiocarbonylmethylthio, and the like; the substituted and unsubstituted tertiary aminoalkylthiocarbonylalkylthio radicals, e.g., dimethylaminoethylthiocarbonylmethylthio, diethylaminoethylthiocarbonylmethylthio, and the like; the piperidinoalkylthiocarbonylalkylthio, the piperazinoalkylthiocarbonylalkythio, the pyrrolidinoalkylthiocarbonylthioalkyl, the morpholinoalkylthiocarbonylalkylthio, and the like; the substituted and unsubstituted secondary aminoalkylthiocarbonylalkylthio radicals, e.g., ethylaminoethylthiocarbonylmethylthio, isopropylaminoethylthiocarbonylmethylthio, and the like.

Additionally representative radicals include: the primary N - (aminoalkyl)carbamoylalkylthio groups, e.g., N-(aminoethyl)carbamoylmethylthio and the like; the substituted and unsubstituted tertiary N - (aminoalkyl)carbamoylalkylthio groups, e.g., N-(dimethylaminoethyl)carbamoylethylthio, N - (diethylaminoethyl)carbamoylmethylthio, and the like; the N-(piperidinoalkyl)carbamoylalkylthio, the N - (piperazinoalkyl)carbamoylalkylthio, the N - (pyrrolidinoalkyl)carbamoylalkylthio, the N - (morpholinoalkyl)carbamoylalkylthio and the like; the substituted and unsubstituted secondary N-(aminoalkyl)carbamoylalkylthio radicals, e.g., N-(methylaminoethyl)carbamoylmethylthio, N - (isobutylaminopropyl) carbamoylethylthio and the like.

Other representative radicals include the primary aminoalkylsulfinyl radicals, e.g., aminoethylsulfinyl, aminopropylsulfinyl, and the like; the substituted and unsubstituted tertiary aminoalkylsulfinyl radicals, e.g., dimethylaminoethylsulfinyl, diethylaminoethylsulfinyl, dibutylaminoethylsulfinyl and the like; the piperidinoalkylsulfinyl, the piperazinoalkylsulfinyl, the pyrrolidinoalkylsulfinyl, the morpholinoalkylsulfinyl, and the like; the substituted and unsubstituted secondary aminoalkylsulfinyl radicals, e.g., methylaminoethylsulfinyl, pentylaminopropylsulfinyl and the like.

A final class of representative radicals includes the primary aminoalkylsulfonyl radicals, e.g., aminoethylsulfonyl, aminobutylsulfonyl, and the like; the substituted and unsubstituted tertiary aminoalkylsulfonyl radicals, e.g., dimethylaminoethylsulfonyl, diethylaminoethylsulfonyl, diisopropylaminopentylsulfonyl, and the like; the piperidinoalkylsulfonyl, the piperizinoalkylsulfonyl, the pyrrolidinoalkylsulfonyl, the morpholinoalkylsulfonyl, and the like; the substituted and unsubstituted secondary aminoalkylsulfonyl radicals and the like, e.g., methylaminoethylsulfonyl, butylaminopentylsulfonyl and the like.

Synthesis of the novel aminoaliphaticnortricyclenes of the present invention may be effected by a variety of processes. For instance, a polyhetero organic moiety and a nortricyclene nucleus can be linked through a sulfur atom by the addition reaction of bicycloheptadiene with a sulfur-containing aminoaliphatic compound or a linked thio compound is oxidized to the corresponding sulfinyl or sulfonyl aminoaliphaticnortricyclene. The generalized process for the preparation of the thio compositions by this method can be illustrated as follows:

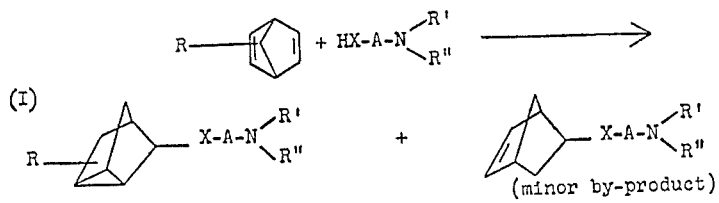

wherein X, A, R, R' and R" have the same values as previously indicated. Separation of the by-product is effected by known methods.

In the above described synthesis, it will be apparent to those skilled in the art of chemistry that the proportion of reactants, duration of reaction, solvents, catalysts, and the like can be varied depending on the type of reactant.

From the specific reaction conditions given in the examples, it will be obvious to those skilled in the art of chemistry that the reagents and conditions which can be employed in the inventive process of reaction (I) will depend to a great extent on the nature of the thiol as well as the particular bicycloheptadiene.

In general, a temperature range from about 25° C. to about 150° C. has been found to be satisfactory. Temperatures above and below the aforementioned range can also be employed but are less preferred.

It is also preferred, although not necessary, that the reaction of the bicycloheptadiene and thiol compound be conducted in an inert solvent. In general, the choice of solvent will largely be dependent upon its inability to undergo reactions with either the starting materials or reaction products, its ease of separation from the reaction product, as well as economic considerations.

A variety of inert solvents can be employed in the practice of the instant process, i.e., saturated aliphatic hydrocarbons, aromatic hydrocarbons, aliphatic alcohols, water, and the like. Typical solvents which can be employed include benzene, toluene, xylene, ethanol, tertiary butanol, secondary butanol, 2-propanol, tertiary amyl alcohol, methyl isobutyl carbinol, acetone, acetonitrile, dimethylformamide, and the like. Preferred solvents are those completely miscible with the reactant and product and which can be readily separated.

Pressure is not necessarily critical and the process can be conducted at atmospheric, subatmospheric or superatmospheric pressures.

The contact time necessary to effect the novel process of the present invention need only be of such duration as to insure optimum conversion of the reactants to the corresponding aminoaliphaticnortricyclene compound. Reaction times of several hours are thoroughly practicable. Shorter or longer periods can also be feasibly employed depending upon the temperature (higher temperatures usually permit the use of shorter reaction times), and the manner in which the process is conducted. Generally, the reaction is essentially complete in less than 20 hours.

Oxidation of the aminoaliphaticthionortricyclenes to the corresponding sulfinyl or sulfonyl compounds can be conveniently effected by known prior art procedures. For example, 3 - (dimethylaminoethylthio) - nortricyclene hydrochloride can be oxidized easily to 3-(dimethylaminoethylsulfinyl)-nortricyclene hydrochloride with hydrogen peroxide. Other peroxides can also be employed.

In addition to the reaction of bicycloheptadiene with a sulfur containing aminoaliphatic compound, the novel compositions of this invention can be prepared by other routes. For instance, as indicated in Examples 7 and 8, the compositions are formed by substitution of the amino nitrogen of an aminoethylthionortricyclene. Additionally, the products of examples 10, 11 and 12 are formed by reactions with a nortricyclenylthioacetic acid derivatives.

As previously indicated, the starting materials for the preparation of the novel compositions of this invention are the bicycloheptadienes and aminoaliphaticthiols.

These reactants are known compounds or can be prepared by known methods. Illustrative starting materials include, among others, bicycloheptadiene, alkyl-substituted bicycloheptadienes, aminoethylthiol, dimethylaminoethylthiol, diethylaminoethylthiol, diethylaminopropylthiol, piperidinoethanethiol, and the like.

The manner of making and using the compositions and processes of the invention is further illustrated by the following examples, which set forth one mode contemplated for carrying out the invention so as to enable any person skilled in the art of chemistry to make and use the same.

EXAMPLE 1

3-(diethylaminoethylthio)-nortricyclene

A stirred mixture of 680 grams (4 moles) of diethylaminoethanethiol hydrochloride, 555 grams (6 moles) of bicycloheptadiene and 800 milliliters of dimethylformamide was heated on a steam bath for a period of 20 hours. All of the material dissolved during approximately the first two hours. The resultant dark-colored solution was allowed to cool and poured into 2 liters of an ice-water slurry. The mixture was acidified with aqueous hydrochloric acid, washed with ether, made alkaline with 20 percent aqueous sodium hydroxide and extracted with ether. Drying and removal of the ether and distillation of the residue gave 765 grams (85 percent) of 3-(diethylaminoethylthio)-nortricyclene, boiling over the range 88–101° C. at a pressure of 0.1 millimeter of mercury. Upon redistillation the product had a boiling point of 99–101° C. at 0.1 millimeter of mercury and a refractive index $n_D^{25}$, 1.5075.

The infrared spectrum of the product, particularly a medium-intensity absorption band at 807 cm.$^{-1}$, is in accordance with the assigned structure.

*Analysis.*—Calculated for $C_{13}H_{23}NS$: N, 6.21. Found: N (basic), 6.24.

The hydrochloride salt, prepared by treatment of an ether solution of the base with ethereal hydrogen chloride and recrystallized from isopropyl, alcohol-ether, showed a melting point of 129–130° C.

*Analysis.*—Calculated for $C_{13}H_{24}ClNS$: C, 59.65; H, 9.24; Cl, 13.54. Found: C, 59.67; H, 9.14; Cl (ionic), 13.32.

The citrate salt, prepared in ether and recrystallized from isopropyl alcohol-ether, melted at 125–126° C.

*Analysis.*—Calculated for $C_{19}H_{31}NO_7S$: N, 3.36; S, 7.68. Found: N (basic), 3.39; S (Schöniger), 7.72.

The cyclohexanesulfamate salt, prepared in isopropyl alcohol-ether and recrystallized from isopropyl alcohol-ether melted at 89–91° C.

*Analysis.*—Calculated for $C_{19}H_{30}N_2O_3S_2$: S, 16.09. Found: S (Schöniger), 16.03.

The methiodide salt, prepared by treatment of an ether solution of the base with methyl iodide and recrystallized from isopropyl alcohol-ether, had a melting point of 115–117° C.

*Analysis.*—Calculated for $C_{14}H_{26}INS$: C, 45.77; H, 7.13; I, 34.55. Found: C, 45.56; H, 7.19; I (ionic), 34.16.

EXAMPLE 2

3-(diethylaminoethylthio)-nortricyclene

A mixture of 10.2 grams (0.11 mole) of bicycloheptadiene and 13.1 grams (0.1 mole) of freshly distilled diethylaminoethanethiol was heated, with occasional shaking, for 20 hours on a steam bath. The cool reaction mixture was diluted with ether and extracted with dilute hydrochloric acid. The aqueous acid solution was made basic and extracted with ether. Drying and removal of the ether in vacuo afforded an oil which was distilled to give 16.2 grams (72 percent) of 3-(diethylaminoethylthio)-nortricyclene having properties essentially identical to those of the product obtained in Example 1.

EXAMPLE 3

3-(3-diethylaminopropylthio)-nortricyclene

In a manner similar to that described in Example 2, bicycloheptadiene was treated with 3-diethylaminopropanethiol to yield 3-(3-diethylaminopropylthio)-nortricyclene. The product had a boiling point of 102–108° C. at a pressure of 0.3 millimeter of mercury and a refractive index, $n_D^{25}$, 1.5033.

*Analysis.*—Calculated for $C_{14}H_{25}NS$: N, 5.85. Found: N (basic), 5.95.

The hydrochloride salt melted at 109–110° C. after recrystallization from acetone-ether.

*Analysis.*—Calculated for $C_{14}H_{26}ClNS$: C, 60.96; H, 9.50; Cl, 12.86. Found: C, 61.26; H, 9.32; Cl (ionic), 12.86.

EXAMPLE 4

3-(dimethylaminoethylthio)-nortricyclene

In a manner similar to that described in Example 2, bicycloheptadiene was treated with dimethylaminoethanethiol to give 3-(dimethylaminoethylthio)-nortricyclene, having a boiling point of 76–78° C. at a pressure of 0.2 millimeter of mercury.

The hydrochloride salt, recrystallized from ethanol and then from acetone, formed colorless needless having a melting point of 187–188° C.

*Analysis.*—Calculated for $C_{11}H_{20}ClNS$: C, 56.50; H, 8.62; Cl, 15.17. Found: C, 56.30; H, 8.45; Cl (ionic), 14.91.

EXAMPLE 5

3-(piperidinoethylthio)-nortricyclene

In a manner similar to that described in Example 2, bicycloheptadiene was treated with piperidinoethanethiol to give 3-(piperidinoethylthio)-nortricyclene.

The hydrochloride salt, recrystallized from isopropyl alcohol-ether and then from acetonitrile, formed colorless crystals, having a melting point of 214–216° C.

*Analysis.*—Calculated for $C_{14}H_{24}ClNS$: C, 61.38; H, 8.83; Cl, 12.95. Found: C, 60.87; H, 8.93; Cl (ionic), 12.98.

EXAMPLE 6

3-(aminoethylthio)-nortricyclene

In a manner similar to that described in Example 1, bicycloheptadiene was treated with aminoethanethiol hydrochloride to yield 3-(aminoethylthio)-nortricyclene having a boiling point of 84–88° C., 1 millimeter of mercury and a refractive index, $n_D^{24}$, 1.5416.

*Analysis.*—Calculated for $C_9H_{15}NS$: N, 8.28. Found: N (basic), 8.18.

The hydrochloride salt, recrystallized from isopropyl alcohol-ethyl acetate, formed colorless crystals having a melting point of 211.2–211.6° C.

*Analysis.*—Calculated for $C_9H_{16}ClNS$: C, 52.54; H, 7.84; Cl, 17.22; S, 15.60. Found: C, 52.14; H, 7.79; Cl (ionic), 17.47; S (Schöniger), 15.83.

EXAMPLE 7

3-($\beta$-hydroxyphenethylaminoethylthio)-nortricyclene

To a solution, heated at reflux, of 23.9 grams (0.14 mole) of the free base form of the product obtained in Example 6 in 25 milliliters of ethanol was added, dropwise, a solution of 18.0 grams (0.15 mole) of styrene oxide in 15 milliliters of ethanol. Heating was continued for an additional 24 hours. The solution was concentrated to dryness under reduced pressure and the residual oil was dissolved in ether and extracted with aqueous hydrochloric acid. The acid extract was made basic and extracted with ether. Drying and removal of the ether and distillation of the residue yielded 16.9 grams (42 percent) of 3 - ($\beta$ - hydroxyphenethylaminoethylthio)-nortricyclene having a boiling point of 189–194° C. at a pressure of 0.3 millimeter of mercury, which solidified on cooling, and had a melting point of 48–50° C.

*Analysis.*—Calculated for $C_{17}H_{23}NOS$: N, 4.84. Found: N (basic), 4.81.

The hydrochloric salt, recrystallized from isopropyl alcohol, melted at 166–168° C.

*Analysis.*—Calculated for $C_{17}H_{24}ClNOS$: C, 62.65; H, 7.42; Cl, 10.88. Found: C. 63.08; H, 7.50; Cl (ionic), 10.95.

EXAMPLE 8

3-(guanidinoethylthio)-nortricyclene

A mixture of 20.5 grams (0.12 mole) of the free base form of the product obtained in Example 6, 16.8 grams (0.06 mole) of 2-methyl-2-thiopseudourea sulfate and 25 milliliters of water was warmed slightly to initiate a vigorous evolution of methyl mercaptan. After the initial reaction had subsided the mixture was heated on a steam bath for 1.5 hours. The precipitate collected from the cooled reaction mixture was recrystallized from methanol-isopropyl alcohol to give 19.3 grams (68 percent) of 3-(guanidinoethylthio)-nortricyclene sulfate in the form of colorless crystals having a melting point of 270–272° C.

*Analysis.*—Calculated for $C_{20}H_{36}N_6O_4S_3$: C, 46.13; H, 6.97; S, 18.45. Found: C, 46.15; H, 6.96; S (Schöniger), 18.54.

EXAMPLE 9

3-(dimethylaminoethylsulfinyl)-nortricyclene

To an ice-cooled solution of 13.1 grams (0.05 mole) of the hydrochloride salt of the product obtained in Example 4 in 300 milliliters of acetone containing 1 milliliter of 10 percent aqueous hydrochloric acid was added, dropwise with stirring, 9.6 grams of 50 percent hydrogen peroxide (0.14 mole). The ice bath was removed and the reaction mixture allowed to stand for 16 hours at room temperature. The precipitated solid was collected and the acetone was allowed to evaporate slowly at room temperature from the filtrate. The residual oil was dissolved in water and the solution was washed with ether, made alkaline and extracted with ether. The dried, ice-cooled ether solution was treated with ethereal hydrogen chloride to precipitate a thick oil which was crystallized from acetone. The combined crystalline solid precipitates, recrystallized from acetonitrile, provided 3.15 grams (25 percent) of 3-(dimethylaminoethylsulfinyl)-nortricyclene hydrochloride as colorless crystals having a melting point of 219–220° C.

*Analysis.*—Calculated for $C_{11}H_{20}ClNOS$: C, 52.88; H, 8.07; Cl, 14.18. Found: C, 52.34; H, 7.94; Cl (ionic), 13.99.

EXAMPLE 10

3-(diethylaminoethylthiolcarbonylmethylthio)-nortricyclene

A solution of 21.0 grams (0.1 mole) of 3-nortricyclenylthioacetyl chloride (boiling point 95–96° C. at 0.005 millimeter of mercury and prepared by treatment of 3-nortricyclenylthioacetic acid with thionyl chloride) in 100 milliliters of dry ether was added, dropwise with stirring, to an ice-cooled solution of 14.0 grams (0.1 mole) of distilled diethylaminoethanethiol and 11.0 grams of triethylamine in 300 milliliters of dry ether. Stirring was continued for a period of 3.5 hours as the reaction mixture warmed to room temperature. The precipitated triethylamine hydrochloride was filtered off and the ether filtrate was extracted with aqueous hydrochloric acid. The acid extract was made basic and the precipitated oil was taken into ether. The dried ether solution was concentrated under reduced pressure and the residual oil was dissolved in ethyl acetate and treated with a solution of cyclohexanesulfamic acid in isopropyl alcohol. Recrystallization of the precipitated salt from isopropyl alcohol afforded 10.8 grams (23 percent) of 3 - (diethylaminoethylthiolcarbonylmethylthio) - nortricyclene in the form of its cyclohexanesulfamate salt, having a melting point of 100–101.5° C.

*Analysis.*—Calculated for $C_{21}H_{38}N_2O_4S_3$: C, 52.68; H, 8.00; S, 20.10. Found: C, 52.89; H, 8.07; S (Schöniger), 20.60.

EXAMPLE 11

3-(diethylaminoethoxycarbonylmethylthio)-nortricyclene

A solution of 36.0 grams (0.2 mole) of 3-nortricyclenylthioacetic acid and 26.9 grams (0.2 mole) of distilled diethylaminoethyl chloride in 100 milliliters of isopropyl alcohol was heated at reflux on a steam bath for 13 hours and then concentrated to dryness in vacuo. The solid residue was taken up in water containing a little dilute hydrochloric acid. The aqueous solution was ether-washed, made basic and extracted with ether. Drying and removal of the ether and distillation of the oil residue gave 33.5 grams (59 percent) of 3-(diethylaminoethoxycarbonylmethylthio)-nortricyclene, distilling over the range 116–125° C. at a pressure 0.1 millimeter of mercury the product had a refractive index, $n_D^{25}$, of 1.5021.

*Analysis.*—Calculated for $C_{15}H_{25}NO_2S$: N, 4.94. Found: N (basic), 4.93.

An ether solution of the base, treated with a solution of cyclohexanesulfamic acid in warm ethyl acetate, afforded a precipitate which was recrystallized from ethyl acetate and then from isopropyl alcohol to give the cyclohexane-sulfamate salt of the product, colorless needles, having a melting point of 116–118° C. Analytical data obtained on this salt showed it to contain 2 moles of cyclohexanesulfamic acid per mole of base.

*Analysis.*—Calculated for $C_{27}H_{51}N_3O_8S_3$: C, 50.51; H, 8.01; S, 14.98. Found: C, 50.89; H, 8.00; S (Schöniger), 15.18. Neutral equivalent: Calculated: 320.9. Found (by titration with 0.1 N NaOH in 80% methyl Cellosolve, two inflections observed): 321.4; $pKa'_1$ 3.52, $pKa'_2$ 7.52.

EXAMPLE 12

3-[N-(diethylaminoethyl)-carbamoylmethylthio]-nortricyclene

A mixture of 40.0 grams (0.2 mole) of methyl 3-nortricyclenylthioacetate (boiling point 81–90° C. at 0.4 millimeter of mercury, refractive index, $n_D^{24}$, 1.5167, prepared by esterification of 3-nortricyclenylthioacetic acid) and 24.5 grams (0.21 mole) of diethylaminoethylamine was heated under reflux for 3 hours in an oil bath held at 155° C. The methanol produced was distilled out and the residual oil was distilled to give 48 grams (85 percent) of 3-[N-(diethylaminoethyl)-carbamoylmethylthio]-nortricyclene as a pale yellow oil, boiling over the range 150–163° C. at 0.2 millimeter of mercury the product had a refractive index, $n_D^{24}$, 1.5242.

*Analysis.*—Calculated for $C_{15}H_{26}N_2OS$: N, 4.96. Found: N (basic), 4.90.

The cyclohexanesulfamate salt, prepared in a mixture of ethanol and ether and reprecipitated several times from ethyl acetate-ether, was obtained in the form of a hygroscopic glass.

*Analysis.*—Calculated for $C_{21}H_{39}N_3O_4S_2$: C, 54.61; H, 8.51; S, 13.89. Found: C, 54.40; H, 8.56; S (Schöniger), 14.02.

EXAMPLE 13

3-(diethylaminoethylsulfonyl)-nortricyclene

To a mixture of 0.05 mole of 3-nortricyclyl vinyl sulfone and 0.05 mole of diethylamine was added 2 drops of Triton B catalyst. After about 10 minutes the reaction became exothermic. The reaction mixture was allowed to stand overnight, then stripped on a 4-inch Claisen type still to 50° C. and 1 millimeter pressure to yield the desired 3-(diethylaminoethylsulfonyl)-nortricyclene.

Analysis for carbon and hydrogen was in agreement with the assigned structure. The hydrochloride salt formed colorless crystals melting at 116°–118° C.

The manner of using the invention sought to be patented in its process aspect will now be described. Quite unexpectedly, it has been discovered that the tangible embodiments of this invention exhibit bronchodilator and other favorable pulmonary effects in man. Hence, the compositions are useful as valuable therapeutic agents for the alleviation and control of pulmonary disorders such as asthma, bronchitis, and the like. Additionally, the compositions have exhibited anti-depressant activity on the central nervous system.

Various well known pharmacologic procedures were carried out to ascertain the bronchodilator activity of 3-(diethylaminoethylthio)-nortricyclene. In the preliminary test, 3(diethylaminoethylthio)-nortricyclene was administered to anesthetized dogs. 3-(diethylaminoethylthio)-nortricyclene HCl was found to produce bronchodilitation with or without induced bronchoconstriction (physostigmine). It compared favorably with aminophylline in anaphylactic shock of guinea pigs and in the dog tracheal chain test. Doses that induced bronchodilitation appeared to have minimal effects on the cardiovascular system. Larger doses produced decreases in blood pressure with tachycardia.

Preliminary toxicity studies on 3-(diethylaminoethylthio)-nortricyclene were conducted following the usual, well defined, and standardized procedures as described in the pamphlet "Appraisal of the Safety of Chemicals in Foods, Drugs and Cosmetics," published in 1959 by the association of Food and Drug Officials in the United States. (Hogen, "Acute Toxicity," page 17; Fitzhugh, "Subacute Toxicity," page 26; and Fitzhugh, "Chronic Oral Toxicity," page 36.) Sixty day subacute toxicity tests in rats (15, 50 and 150 milligrams per kilogram of body weight) and dogs (10, 30 and 100 milligrams per kilogram of body weight) indicated no significant biochemical or histological evidence of toxicity.

The foregoing pharmacological results were confirmed clinically in man. Ten male adults ranging in age from 31 to 61 years and who had chronic pulmonary diseases were medicated four times daily with 3-(diethylaminoethylthio)nortricyclene. The initial medication was started at a dosage of 800 milligrams per day and increased every fourth day until a maximum daily dosage of 2,800 milligrams was reached. One subject who had arrested pulmonary tuberculosis, and three subjects who had chronic emphysema and fibrosis showed evidence of improved pulmonary function. For one subject no evaluation was made and the remainder showed no change.

The effective dosage of the compounds of this invention depends upon the severity, the stage and the individual characteristics of each case and will be determined by the attending physician. The oral dosage in man is usually within the range of from 50 to about 800 milligrams, or higher. The compounds can be formulated into capsules, tablets, suppositories, injectable solutions and aerosol dosage forms. Tablets and capsules can be formulated with the usual ingredients and excipients such as starch, methylcellulose, natural gums, dibasic calcium phosphate, lubricants, dispersing agents and the like.

It will be apparent to those skilled in the art of chemistry that the composition of this invention can exist in exo and endo stereoisomeric forms, and, moreover, that the compositions will be isolated in the form of racemic mixtures. Any and all such structures are considered to be within the scope of this invention.

Simple substituents on the nortricyclene moiety of the compounds of the present invention do not adversely affect the pharmacological properties thereof, and are to be regarded as the full equivalents of the compounds of the invention wherein the nortricyclene moiety is unsubstituted. For example, the amino portion of the molecule may also contain substituents in either or both of the R' or R" groups, or on the ring when both R' and R" together form a heterocyclic ring. Such additions to the molecular structure of the inventive concept herein described are, therefore, equivalents of the subject matter sought to be patented.

As previously indicated, the aforementioned general formula defines the compounds of the present invention as the free base form thereof. Inasmuch as the physical embodiments of the inventive concept have pharmacological utility, for such use the compounds will usually be administered in the form of their pharmaceutically acceptable acid addition salts, these salts are the full equivalents of the free base forms thereof. The acid addition salts can be prepared by reacting the corresponding free bases in a conventional manner with an inorganic acid such as hydrochloric, hydrobromic, sulfuric and phosphoric; or an organic acid, such as methanesulfonic, ethanesulfonic, ethanedisulfonic, cyclohexylsulfamic, formic, maleic, citric, tartaric and tannic acids. The compounds can also be administered in the form of their quaternary ammonium salts formed by the reaction of the appropriate tertiary amino derivatives of the invention with a lower alkyl halide.

In addition to their use as the essential active ingredient in pharmaceutical formulations, the novel compositions of this invention can be employed in a variety of other fields. For example, the aminoaliphaticnortricyclene compounds of this invention are useful as intermediates in the synthesis of other chemical compounds. Moreover, due to the presence of the amine groups certain of the composition are useful as acid acceptors in reactions involving the release of inorganic acidic by-products.

The invention can be embodied in other specific forms without departing form the spirit or essential characteristics thereof. The foregoing physical embodiments are, therefore, to be considered in all respects illustrative and not restrictive, the scope of the invention being indicated by the appended claims rather than by the foregoing description, and all changes which come within the meaning and range of equivalency of the claims are therefore intended to be embraced therein.

What is claimed is:

1. A compound selected from the group consisting of aminoaliphaticnortricyclenes of the formula:

wherein X is selected from the group consisting of thio, sulfinyl or sulfonyl; A is alkylene of from 2 to 6 carbon atoms; R, R' and R" are selected from the group consisting of hydrogen and lower alkyl.

2. The composition of claim 1 wherein R is hydrogen and

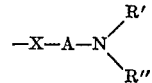

is the aminoalkylthio group.

3. The composition of claim 1 wherein R is hydrogen and

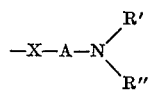

is the dialkylaminoalkylthio group.

4. The composition of claim 1 wherein R is hydrogen and

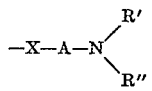

is the dialkylaminoalkylsulfinyl group.

5. The composition of claim 1 wherein R is hydrogen and

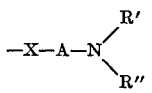

is the dialkylaminoalkylsulfonyl group.

6. 3-(aminoethylthio)-nortricyclene.
7. 3-(dimethylaminoethylthio)-nortricyclene.
8. 3-(diethylaminoethylthio)-nortricyclene.

9. 3-(3-diethylaminopropylthio)-nortricyclene.
10. 3-(diethylaminoethylsulfonyl)-nortricyclene.

References Cited

JACS, vol. 80, pp. 635–640, February 1958, Cristol et al.

Tetrahedron Letters, July-August 1964, No. 32, pp. 2181–2184, Sauers et al.

HENRY R. JILES, Primary Examiner

S. D. WINTERS, Assistant Examiner

U.S. Cl. X.R.

260—247.1, 268, 293.4, 326.3, 326.5, 326.82, 326.84, 455, 468, 471, 482, 557, 558, 559, 561, 562, 563, 564, 570.8, 573, 574, 576, 583, 999